(12) United States Patent
Wolfgarten et al.

(10) Patent No.: US 8,584,303 B2
(45) Date of Patent: Nov. 19, 2013

(54) WIPER ARM FOR A WINDOW WIPER SYSTEM, WINDOW WIPER SYSTEM AND METHOD FOR INSTALLING A WINDOW WIPER SYSTEM

(75) Inventors: Sven Wolfgarten, Buehl (DE); Frank Moser, Kuppenheim (DE); Harald Rapp, Buehl (DE); Hermann Burkard, Iffezheim (DE)

(73) Assignee: Robert Bosch GmbH, Stuttgart (DE)

( * ) Notice: Subject to any disclaimer, the term of this patent is extended or adjusted under 35 U.S.C. 154(b) by 398 days.

(21) Appl. No.: 12/993,961

(22) PCT Filed: May 20, 2009

(86) PCT No.: PCT/EP2009/056174
§ 371 (c)(1),
(2), (4) Date: Nov. 22, 2010

(87) PCT Pub. No.: WO2009/141396
PCT Pub. Date: Nov. 26, 2009

(65) Prior Publication Data
US 2011/0078869 A1    Apr. 7, 2011

(30) Foreign Application Priority Data
May 21, 2008    (DE) .......................... 10 2008 001 938

(51) Int. Cl.
*B60S 1/34*    (2006.01)
*B60S 1/36*    (2006.01)

(52) U.S. Cl.
USPC ................ 15/250.23; 15/250.351; 15/250.31; 403/122; 403/143; 29/428

(58) Field of Classification Search
USPC ............. 15/250.23, 250.21, 250.351, 250.31; 403/122, 125, 135, 143; 29/428
See application file for complete search history.

(56) References Cited

U.S. PATENT DOCUMENTS 1,740,971 A * 12/1929 Corlett .......................... 403/122
2,018,365 A * 10/1935 Klages et al. ................... 403/36
3,147,537 A *  9/1964 Fadow ..................... 29/898.044

(Continued)

FOREIGN PATENT DOCUMENTS

| | | |
|---|---|---|
| GB | 2026085 A | 1/1980 |
| JP | 5875151 | 5/1983 |
| JP | 2000329133 | 11/2000 |
| WO | 2006/072497 A1 | 7/2006 |

OTHER PUBLICATIONS

PCT/EP2009/056174 International Search Report, Aug. 2009.

*Primary Examiner* — Gary Graham
(74) *Attorney, Agent, or Firm* — Michael Best & Friedrich LLP

(57) ABSTRACT

The invention relates to a wiper arm (1) for a window wiper system, in particular for a motor vehicle, with a wiper rod (2) and a control rod (5) which is movable relative to the wiper rod (2) and is coupled to the wiper rod (2), wherein the control rod (5) can be fixed by means of an articulated shell (21) on an articulated head (13) of a window wiper system. According to the invention, the articulated shell (21) is designed as an articulated shell component (14) which is separate from a fastening component (11) fixed to the control rod (5) and can be fixed to the fastening component (11). Furthermore, the invention relates to a window wiper system and to an installation method.

19 Claims, 2 Drawing Sheets

(56) References Cited

U.S. PATENT DOCUMENTS

| | | | |
|---|---|---|---|
| 4,286,363 A * | 9/1981 | Morin | 29/898.043 |
| 4,695,180 A * | 9/1987 | Saito | 403/114 |
| 4,716,612 A * | 1/1988 | D'Alba | 15/250.23 |
| 4,918,780 A * | 4/1990 | Scorsiroli | 15/250.21 |
| 5,033,157 A * | 7/1991 | von Meltzing et al. | 15/250.21 |
| 5,634,234 A * | 6/1997 | Allain | 15/250.003 |
| 2003/0056314 A1 | 3/2003 | Heinrich et al. | |

\* cited by examiner

WIPER ARM FOR A WINDOW WIPER SYSTEM, WINDOW WIPER SYSTEM AND METHOD FOR INSTALLING A WINDOW WIPER SYSTEM

BACKGROUND OF THE INVENTION

The invention relates to a wiper arm for a window wiper system, a window wiper system, and an installation method.

Window wiper systems with a single wiper arm (single lever system window wiper systems) are known. In order to be able to wipe over a wiping area, which is predetermined by law, on the windshield using a single wiper arm, the wiper arm of such a single lever system window wiper system has, in addition to a wiper rod, a control rod which executes a movement coupled to the wiper rod and deflects the actual wiper blade during the pivoting movement of the wiper arm relative to the wiper rod. In the known wiper arm, the control rod is connected at one end to a wiper linkage carrier in an articulated manner. For this purpose, the end side of the control rod is encapsulated by injection molding by a plastic section in which a ball socket of a ball and socket joint is formed. In the fitted state, said ball socket interacts with a ball head of the ball and socket joint, which is fixed on the carrier of the wiper linkage and is therefore fixed on the bodywork. To install the wiper arm, or more precisely the control rod, the latter together with the ball socket thereof, which is formed in the plastic section fixed directly on the control rod, is clipped onto the ball head fixed on the bodywork.

One drawback of the known construction is that the control rod may become detached from the ball head due to forces acting during operation. Another drawback is that a two step painting process for painting the control rod and the plastics section has to be realized due to the different material composition of the plastics section having the ball socket and of the steel control rod.

SUMMARY OF THE INVENTION

Technical Problem

The invention is based on the concept of proposing a wiper arm with an improved fastening concept for fixing the control rod on a joint head fixed on the bodywork. Furthermore, there is the problem of proposing a correspondingly optimized window wiper system and a suitable installation method for a window wiper system of this type.

Technical Solution

This problem is solved with regard to the wiper arm by the features of the following claims. All of the combinations of at least two features disclosed in the description, the claims and/or the figures fall within the scope of the invention. To avoid repetitions, features disclosed in terms of the method should also be considered to be disclosed in terms of the device and should be claimable. Similarly, features disclosed in terms of the device should be considered to be disclosed in terms of the method and should be claimable.

The invention is based on the concept of not fixing the joint socket, which is designed for interaction with a joint head fixed on the bodywork, directly on the control rod, but rather of arranging or forming the joint socket on a joint socket component which can be fixed on the control rod via a fastening component separate from the joint socket component, rather than directly. In this case, the combination of fastening component and joint socket component can be designed in such a manner that the joint socket component can be fixed releasably on the fastening component, or else in such a manner that a joint socket component once fixed on the fastening component remains permanently connected to the fastening component. The novel connecting concept makes it possible, when the need arises, to form the fastening component and the control rod from a similar or identical material such that the fastening component can be painted together with the control rod in a combined standard painting process. For example, the fastening component and the control rod can be formed from metal, preferably from the same metal, in particular from steel sheet, in order to facilitate the installation as well as the painting. A wiper arm designed in accordance with the concept of the invention also makes it possible, if the need arises, to design the fastening component in such a manner that it secures the joint socket component against being unintentionally detached from the joint head fixed on the bodywork. At this juncture, it should be expressly pointed out that the same or similar choice of material for the fastening component and control rod and the fastening component design securing the joint socket component are merely possible and not necessary further design options for the wiper arm. For most application purposes, the advantages obtainable with a wiper arm designed in accordance with the concept of the invention outweigh the drawback, in comparison to the prior art, of having to provide an additional component (separate fastening component).

An embodiment of the wiper arm is of particular advantage, in which the joint shell component is designed in such a manner that it can be latched to the joint head or can be clipped thereon. For this purpose, it is preferred if the joint socket component is of elastic design, at least in sections in the region of an insertion opening for receiving the joint head, in order to be able to receive the joint head during installation and to enclose it in sections for this purpose.

In order to guarantee a particularly robust connection between the joint socket component and the fastening part, an embodiment is preferred in which the joint socket component can be connected, or is connected in the fitted state, to the fastening component in an interlocking manner.

An interlocking connection between the joint socket component and the fastening component may be realized, for example, by the fastening component engaging behind the joint socket component in the fitted state, preferably on a side which faces the joint head in the fitted state.

In a development of the invention, it is advantageously provided that, as already mentioned at the beginning, the fastening component interacts with the joint socket component in such a manner that the joint socket component is secured against being unintentionally pulled off from the joint head counter to the installation direction. In this connection, an embodiment of the wiper arm is particularly advantageous, in which the fastening component interacts with the joint socket component, in particular by the fastening component enclosing the joint socket component at least in sections, in such a manner that the in particular rigid fastening component, which is preferably composed of steel sheet, prevents an expansion of the joint socket component, which expansion would be necessary, however, in order to temporarily expand the insertion opening in the joint socket component in order to permit the joint head to slide out. In addition or as an alternative, it can be realized that the fastening component partially closes the insertion opening in the joint socket component, which insertion opening is designed for the insertion of the joint head during installation, preferably by engaging around the joint socket component. By means of the partial closing of said insertion opening, it is then no longer possible for the joint socket component to be pulled off from the joint head fixed on the bodywork counter to the installation direction (plug in direction/clip on direction).

An embodiment of the wiper arm is particularly advantageous, in which, for fixing on the fastening component, the joint socket component can be pushed into a receptacle (preferably a cutout open on the edge) of the fastening component, preferably perpendicularly to an installation direction for installing the joint socket component on the joint head. The procedure during installation is preferably such that the joint socket component is first of all pushed, preferably clipped, onto the joint head. Subsequently, the fastening component is fastened to the joint socket component, preferably by being pushed on, and in particular in an interlocking manner. It is particularly preferred in this case if, after being pushed in, the joint socket component is engaged behind by the fastening component and is preferably secured as a result against being unintentionally pulled off from the joint head.

In a development of the invention, it is advantageously provided that both the fastening component and the control rod are formed from metal, preferably from steel. This firstly enables plastics injection molding of the fastening component to be omitted. Secondly, the fixing of the fastening component on the control rod is facilitated, in particular if the fastening component is fixed by crimping on the control rod. In this case, the fastening component is first of all pushed over an end control rod section and is then subjected from the outside to a radially inwardly acting crimping force.

An embodiment of the wiper arm is particularly advantageous, in which the control rod and the fastening component are/have been painted in a combined painting step. In this case, the fastening component which is fixed on the control rod, in particular by crimping, is preferably inserted together with the control rod into a cathodic paint dipping bath.

A particularly low friction connection of the control alarm to a component fixed on the bodywork is ensured by the joint socket of the joint socket component being designed as a (partial) ball socket and the head as a (partial) ball head such that the joint socket and the joint head together form a ball and socket joint.

The invention is also directed toward a window wiper system. The latter is distinguished by a previously described wiper arm. The wiper arm is preferably the single wiper arm of the window wiper system, wherein it is furthermore preferred to design the window wiper system as a windshield wiper system.

In the fitted state of the window wiper system, the joint socket component receiving the joint head is fixed on the fastening component which, in turn, is connected to the control rod in particular by crimping.

The invention is furthermore directed toward an installation method for installing a window wiper system. The method is characterized by at least the two following steps: fixing a joint head of the window wiper system, which joint head is in particular fixed on the bodywork, on a joint socket component, and subsequently fixing the joint socket component on a fastening component which has been connected in a preceding step to the control rod, preferably by crimping.

The joint socket component is preferably fixed on the fastening component by the joint socket components being pushed into a receptacle of the fastening component, where only the fastening component, rather than the joint socket component, is preferably actively moved in this case.

The joint socket component is particularly preferably fastened on the fastening component in such a manner that, after the fixing, the joint socket component is secured against being unintentionally pulled off from the joint head.

In a development of the invention, it is advantageously provided that the control rod and the fastening component are painted in a combined painting step, preferably in a painting cathode dipping bath, at a time prior to the joint socket component being fixed on the fastening component.

BRIEF DESCRIPTION OF THE DRAWINGS

Further advantages, features and details of the invention emerge from the description below of preferred exemplary embodiments and with reference to the drawings, in which.

DETAILED DESCRIPTION

Identical components and components having the same function are identified by the same reference numbers in the figures.

Figure 1:
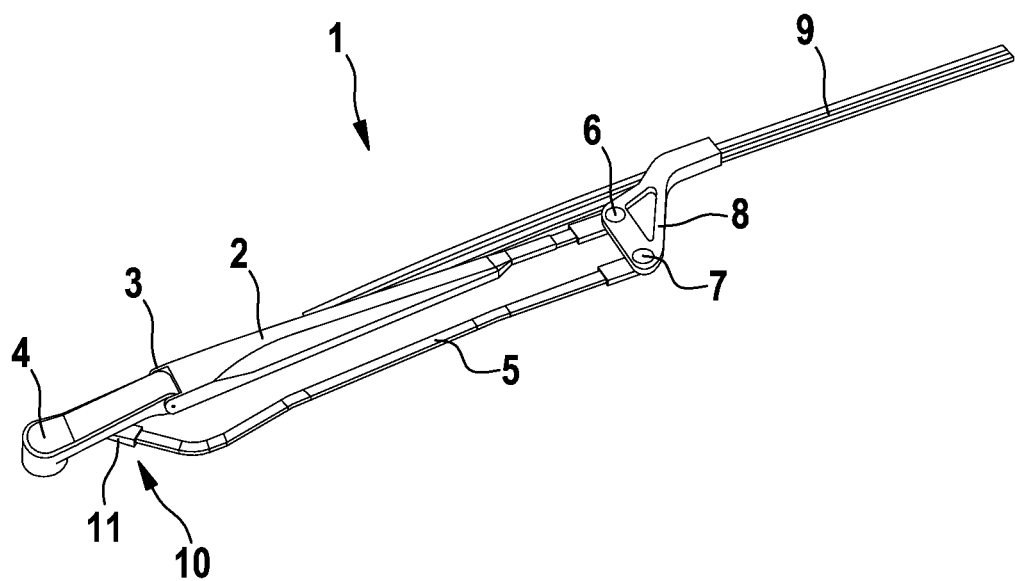
FIG. 1 shows a perspective view of a wiper arm for a single lever system window wiper system.

FIG. 1 shows a wiper arm 1 for a window wiper system which is otherwise known. The wiper arm 1 comprises a wiper rod 2 which is fixed on a fixing component 4 by means of a pivot joint 3. In this case, a pivot axis of the pivot joint 3 extends transversally with respect to the longitudinal extent of the wiper arm 1. The wiper rod 2 consists of a joint part 22 on the left in the plane of the drawing and of a rod part 23 crimped to said joint part.

With the aid of the fixing component 4, the wiper arm 1 can be fixed on a wiper shaft (not shown) of the window wiper system for rotation in common such that pivoting of the wiper shaft leads to pivoting of the wiper arm 1 on the motor vehicle window. The wiper shaft itself in turn can be driven, for example, via a crank linkage which, in turn, is assigned an electric driving motor. Furthermore, an embodiment of the window wiper system can be realized, in which a linkage of this type is dispensed with, and the wiper arm 1 is driven in an oscillating manner either directly by a driving motor or by a converter mechanism arranged between the driving motor and the wiper arm 1.

In addition to the wiper rod 2, the wiper arm 1 comprises a control rod 5 made from steel. The control rod 5 extends over the majority of the longitudinal extent thereof virtually parallel to the wiper rod 2. Both the control rod 5 and the wiper rod 2 are connected in an articulated manner at their ends facing away from the fixing component 4 to a holding element 8 of the wiper arm 1 via a respective joint 6, 7, the holding element 8 bearing a wiper blade 9. The joints 6, 7 are arranged at a distance from each other, the holding element 8 coupling the adjustment movement of the wiper rod 2 and of the control rod 5 in such a manner that a pivoting movement of the wiper rod 2 leads to a coupled, defined pivoting movement of the control rod 5 which, in turn, causes a relative movement of the holding element 8 and therefore of the wiper blade 9 relative to the wiper rod 2 in order to be able to wipe over motor vehicle window sections which would otherwise be omitted.

Figure 2:
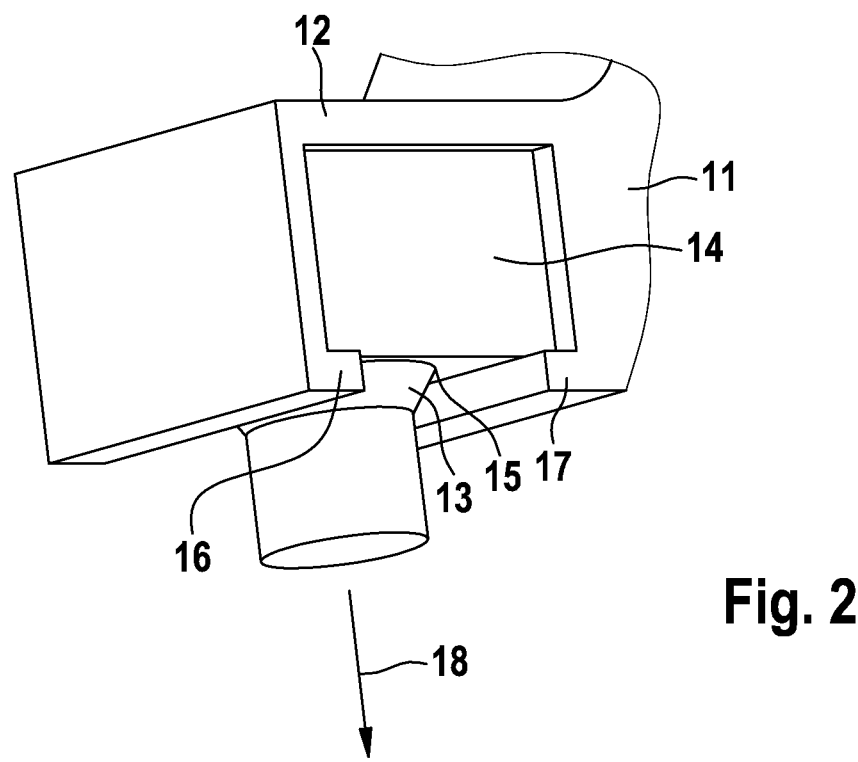
FIG. 2 shows an enlarged wiper arm detail which is not visible in FIG. 1 and shows a fastening component which bears a joint socket component with a joint head accommodated therein, wherein the fastening component can be fixed by crimping on the control rod shown in FIG. 1.

As is furthermore revealed in FIG. 1, a fastening component 11 which is likewise formed from steel sheet is fixed by crimping on the end 10 pointing away from the holding element 8, the fastening component 11 being illustrated in partially enlarged form in FIG. 2. In the illustration according to FIG. 1, the fastening component 11 is for the most part concealed by the fixing component 4.

The fastening component 11 which is fixed on the control rod 5 by crimping has a groove like receptacle 12 which is open on the side facing a joint head 13 which is designed as a ball head. The fastening component 11 is pushed with the receptacle 12 thereof over a joint socket component 14 which is designed as a socket component of a ball and socket joint, is made from plastic and serves on the side thereof which faces the joint head 13 fixed on the bodywork as an insertion opening 15 for installing the joint socket component 14 on the joint head 13. The control rod 5 and the fastening component 11 have been painted in a combined painting step prior to the installation of the joint socket component 14 with the joint head 13 accommodated therein.

As is furthermore revealed in FIG. 2, two shoulders 16, 17 of the fastening component 11, which shoulders run parallel to each other, engage behind the joint socket component 14 on the side facing the vehicle bodywork (not illustrated). The shoulders 16, 17 prevent the joint socket component 14 from being pulled off from the joint socket head 13 counter to the clipping in direction 18 in which the joint socket component 14 has been pushed onto the joint head 13 during installation. In this case, the securing against the joint socket component 14 being unintentionally pulled off from the joint head 13 can be substantially attributed to the fact that the rigid fastening component 11 reliably prevents an expansion of the joint socket component 14 to enlarge the insertion opening 15, said expansion being necessary for the joint socket component 14 to be pulled off from the joint head 13. The distance between the mutually opposite shoulders 16, 17 is selected to be smaller than the maximum diameter of the joint head 13. Only after the fastening component 11 is pushed off the joint socket component, i.e. in a disassembled position, can the joint socket component 14 be pulled off from the joint head 13 counter to the clipping in direction 18.

As is furthermore revealed in FIG. 2, the cross sectional contour of the receptacle 12 is rectangular, the joint socket component 14 being formed congruently in terms of shape to the inner contour of the receptacle 12.

Figure 3:
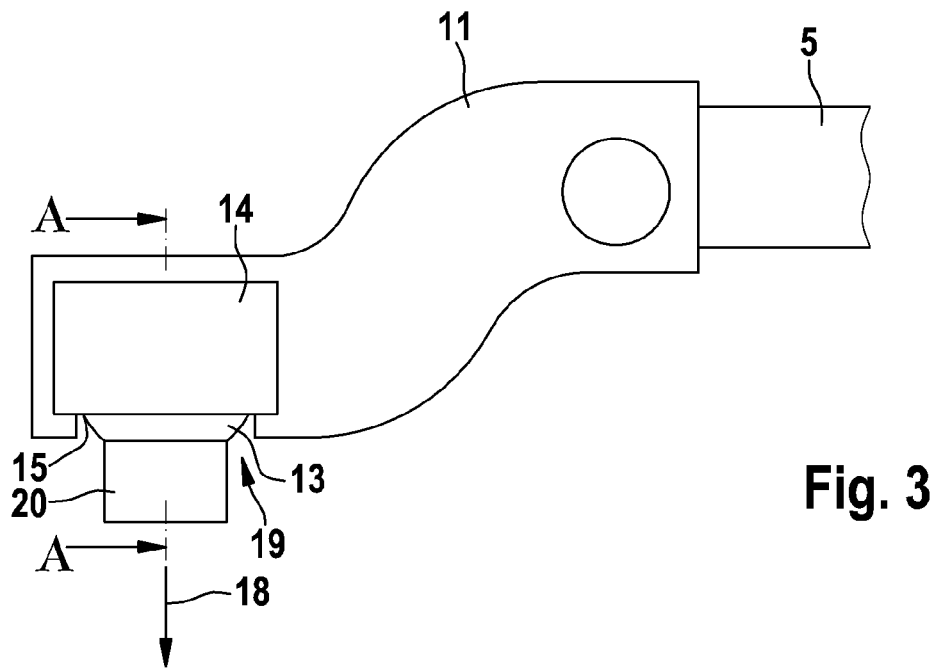
FIG. 3 shows a side view of the connection of control rod, fastening component, joint socket component and joint head.

FIG. 3 shows a side view of the arrangement comprising the control rod 5, the fastening component 11 which is fixed thereon by crimping, and the joint socket component 14 which is held in an interlocking manner by the fastening component 11 and in the insertion opening 15 of which the joint head 13 which is fixed on the bodywork is in turn held. As is revealed in FIG. 3, the installation direction for pushing the fastening component 11 onto the joint component 14 is oriented at right angles to the clipping in direction 18 (installation direction) in which the joint socket component 14 has to be pushed beforehand onto the joint head 13.

As is furthermore revealed in FIG. 3, the distance of the shoulders 16, 17, which engage behind the joint socket component 14, is smaller than the width of the joint socket component 14 and also smaller than the width of the receptacle 12. The shoulders 16, 17 bound an entrance 19 to the receptacle 12, through which a fastening bolt 20, which is formed integrally with the joint head 13, is led out in the direction of the clipping in direction 18, wherein the width of the entrance 19 is smaller than the diameter of the joint head 13. The joint head 13 is fixed by means of the fastening bolt 20 on a component fixed on the bodywork, preferably on a linkage carrier or on a gear housing of the window wiper system.

Figure 4:
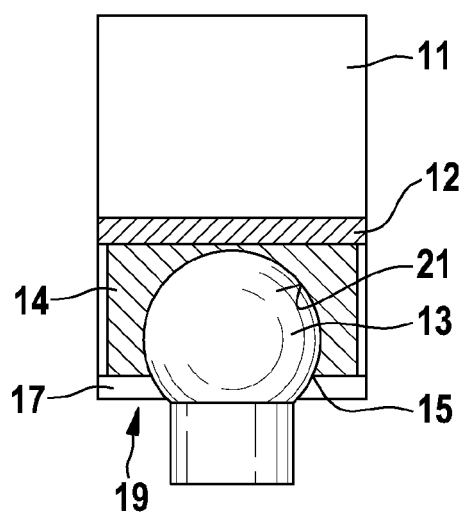
FIG. 4 shows a sectional view along the section line A A according to FIG. 3.

FIG. 4 shows a sectional view of the illustration according to FIG. 3. The joint head 13, the end side of which is contoured spherically, can be seen. The ball head 13 is received in a spherical joint socket 21, which is formed within the joint socket component 14, in such a manner that the joint socket component 14 together with the fastening component 11 and the control rod 5 can be pivoted relative to the joint head 13 fixed on the bodywork. Furthermore, a shoulder 17 which bounds the entrance 19 and engages behind the joint socket component 14 on the side facing the vehicle bodywork, can be seen. Furthermore, the fastening component 11 with the receptacle 12 thereof for the lateral pushing in of the joint socket component 14 can be seen, wherein the fastening component 11 engages around the joint socket component 14 completely on three sides arranged at right angles to one another and partially on a fourth, lower side—where it engages with the aid of the shoulders 16, 17—and therefore holds said joint socket component in an interlocking manner.

The invention claimed is:

1. A wiper arm for a window wiper system, with a wiper rod (2) and a control rod (5) which is movable relative to the wiper rod (2) and is coupled to the wiper rod (2), wherein the control rod (5) is fixed on a joint head (13) of a window wiper system by means of a joint socket (21), characterized in that the joint socket (21) includes a joint socket component (14) which is separate from a fastening component (11) fixed on the control rod (5), wherein the joint head includes a ball seated in a socket of the joint socket component to form a ball and socket joint, the joint socket component having an insertion opening centered on a first axis and the joint head extending into the socket through the insertion opening, wherein the fastening component (11) defines a receptacle in which the joint socket component is seated, wherein the fastening component has an entrance opening through which the first axis passes and through which the joint head extends, the entrance opening being smaller than the joint socket component such that the joint socket component cannot be inserted into the receptacle through the entrance opening, and wherein the fastening component has therein a second opening centered on a second axis transverse to the first axis, the second opening being sized to allow insertion of the joint socket component into the receptacle.

2. The wiper arm as claimed in claim 1, characterized in that the joint socket component (14) is connected in an interlocking manner to the fastening component (11).

3. The wiper arm as claimed in claim 1, characterized in that the fastening component (11) engages behind the joint socket component (14) fixed on the fastening component (11).

4. The wiper arm as claimed in claim 1, characterized in that the fastening component (11) secures the joint socket component (14) against being pulled off from the joint head (13), wherein the fastening component (11) closes the insertion opening (15) in the joint socket component (14), said insertion opening being designed for inserting the joint head (13) into the joint socket component (14).

5. The wiper arm as claimed in claim 1, characterized in that, for fixing on the fastening component (11), the joint socket component (14) is inserted into a the receptacle (12) of the fastening component (11), by said fastening component (11) preferably being pushed laterally onto the joint socket component (14).

6. The wiper arm as claimed in claim 1, characterized in that the fastening component (11) is formed from metal.

7. The wiper arm as claimed in claim 1, characterized in that the fastening component (11) is fixed by crimping on the control rod (5).

8. The wiper arm as claimed in claim 1, characterized in that the control rod (5) and the fastening component (11) are painted in a combined painting step by dipping into a cathodic paint dipping bath.

9. A window wiper system with, exclusively, one wiper arm (1) as claimed in claim 1.

10. The window wiper system as claimed in claim 9, characterized in that the joint head (13) of the window wiper system is fixed on bodywork of a vehicle.

11. A method for assembling a window wiper system, as claimed in claim 9, characterized by the following steps: fixing the joint head (13) of the window wiper system on the joint socket component (14), and then fixing the joint socket component (14) on the fastening component (11) which has been fixed beforehand on the control rod (5), preferably by crimping.

12. The method as claimed in claim 11, characterized in that the joint socket component (14) is fixed on the fastening component (11) in such a manner that the joint socket component (14) is secured against being pulled off from the joint head (13).

13. The method as claimed in claim 11, characterized in that the control rod (5) and the fastening component (11) are painted in a combined painting step prior to the fixing of the joint socket component (14).

14. The wiper arm as claimed in claim 1, wherein the fastening component includes spaced, parallel shoulders defining the entrance opening, the shoulders engaging the joint socket component (14) to prevent the joint socket component from being pulled off the joint head along the first axis.

15. The wiper arm as claimed in claim 14, wherein the shoulders are spaced a distance smaller than the maximum diameter of the joint head.

16. The wiper arm as claimed in claim 1, wherein the entrance opening extends parallel to the second axis.

17. The wiper arm as claimed in claim 16, wherein the second opening is generally perpendicular to the entrance opening.

18. The wiper arm as claimed in claim 1, characterized in that the fastening component (11) secures the joint socket component (14) against being pulled off the joint head (13), wherein the joint socket component is elastic for temporarily enlarging the insertion opening to permit insertion of the joint head, and wherein the fastening component (11) is rigid and prevents expansion of the joint socket component (14).

19. A method for assembling a window wiper system including the wiper arm of claim 1, the method comprising:
inserting the joint head (13) through the insertion opening into the socket of the joint socket component (14); and
thereafter inserting the joint socket component (14) through the second opening into the receptacle of the fastening component (11) with the joint head passing through the entrance opening as the joint socket component is inserted into the receptacle.

* * * * *